US008780796B1

(12) United States Patent
Ballal et al.

(10) Patent No.: US 8,780,796 B1
(45) Date of Patent: Jul. 15, 2014

(54) SYSTEM AND METHOD FOR PROVIDING NETWORK INITIATED MOBILE ACCESS IN A NETWORK ENVIRONMENT

(75) Inventors: Dhiraj D. Ballal, Santa Clara, CA (US); Sachin G. Gorde, San Jose, CA (US); Kiritkumar B. Joshi, Cupertino, CA (US); Virendra K. Malaviya, Cupertino, CA (US); Chandrodaya Prasad, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 531 days.

(21) Appl. No.: 12/548,255

(22) Filed: Aug. 26, 2009

(51) Int. Cl.
*H04W 76/02* (2009.01)

(52) U.S. Cl.
USPC .................. 370/328; 370/450; 455/452.1

(58) Field of Classification Search
None
See application file for complete search history.

(56) References Cited

U.S. PATENT DOCUMENTS

| | | | |
|---|---|---|---|
| 7,042,864 B1 | 5/2006 | Leung et al. | |
| 2003/0060210 A1* | 3/2003 | Ravishankar et al. | 455/452 |
| 2005/0122942 A1* | 6/2005 | Rhee et al. | 370/338 |
| 2006/0187881 A1* | 8/2006 | Kwak et al. | 370/331 |
| 2007/0147244 A1* | 6/2007 | Rasanen | 370/231 |
| 2007/0226780 A1* | 9/2007 | Ronneke | 726/3 |
| 2008/0107067 A1* | 5/2008 | Baek et al. | 370/328 |
| 2008/0192701 A1* | 8/2008 | Jeong et al. | 370/331 |
| 2012/0063428 A1* | 3/2012 | Ng et al. | 370/338 |

OTHER PUBLICATIONS

3rd Generation Partnership Project 2 "3GPP2;" "CDMA2000 Wireless IP Network Standard: Simple IP and Mobile IP Access Services;" 3GPP2 X.S0011-002-D; Version 2.0; Version Date: Nov. 2008; http://www.3gpp2.org/Public_html/specs/X.S0011-002-D_v1.0_060301.pdf; 94 pages.

* cited by examiner

*Primary Examiner* — Jianye Wu
(74) *Attorney, Agent, or Firm* — Patent Capital Group

(57) ABSTRACT

A method is provided in one example embodiment and includes communicating an access request message associated with a mobile node, receiving an access accept message that includes domain name data associated with the mobile node, and communicating a packet data protocol (PDP) context accept message for a tracking PDP context associated with the mobile node without associating an internet protocol (IP) address to the mobile node. The tracking PDP context identifies that the mobile node is available to receive network data. In more particular embodiments, the access request message includes an International Mobile Subscriber Identity (IMSI) associated with the mobile node, and the domain name data includes a fully qualified domain name. In still other embodiments, the tracking PDP includes a protocol configuration option (PCO) indicating that an IP address is not required for the mobile node.

20 Claims, 4 Drawing Sheets

SYSTEM AND METHOD FOR PROVIDING NETWORK INITIATED MOBILE ACCESS IN A NETWORK ENVIRONMENT

TECHNICAL FIELD

This disclosure relates in general to the field of communications and, more particularly, to providing mobile access in a network environment.

BACKGROUND

Networking architectures have grown increasingly complex in communication environments. Domain name system (DNS) protocols can offer the capability for a networked device to notify a domain name server to change the active DNS configuration of its configured hostnames, addresses, or other information stored in the DNS. In some environments, this can include real-time activity in which dynamic DNS providers can offer a software client program that automates the discovery and registration of a client's internet protocol (IP) addresses. Dynamic DNS can allow the client computers or mobile nodes to register and then dynamically update their resource records with a service provider's DNS server. DNS protocols can pose a number of problems, some of which involve coordinating mobility or access to networks for multiple end users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes communicating an access request message associated with a mobile node, receiving an access accept message that includes domain name data associated with the mobile node, and communicating a packet data protocol (PDP) context accept message for a tracking PDP context associated with the mobile node without associating an internet protocol (IP) address to the mobile node. The tracking PDP context identifies that the mobile node is available to receive network data (e.g., IP user data). In more particular embodiments, the access request message includes an International Mobile Subscriber Identity (IMSI) associated with the mobile node, and the domain name data includes a fully qualified domain name. In still other embodiments, the tracking PDP includes a protocol configuration option (PCO) indicating that an IP address is not required for the mobile node.

Example Embodiments

Figure 1:
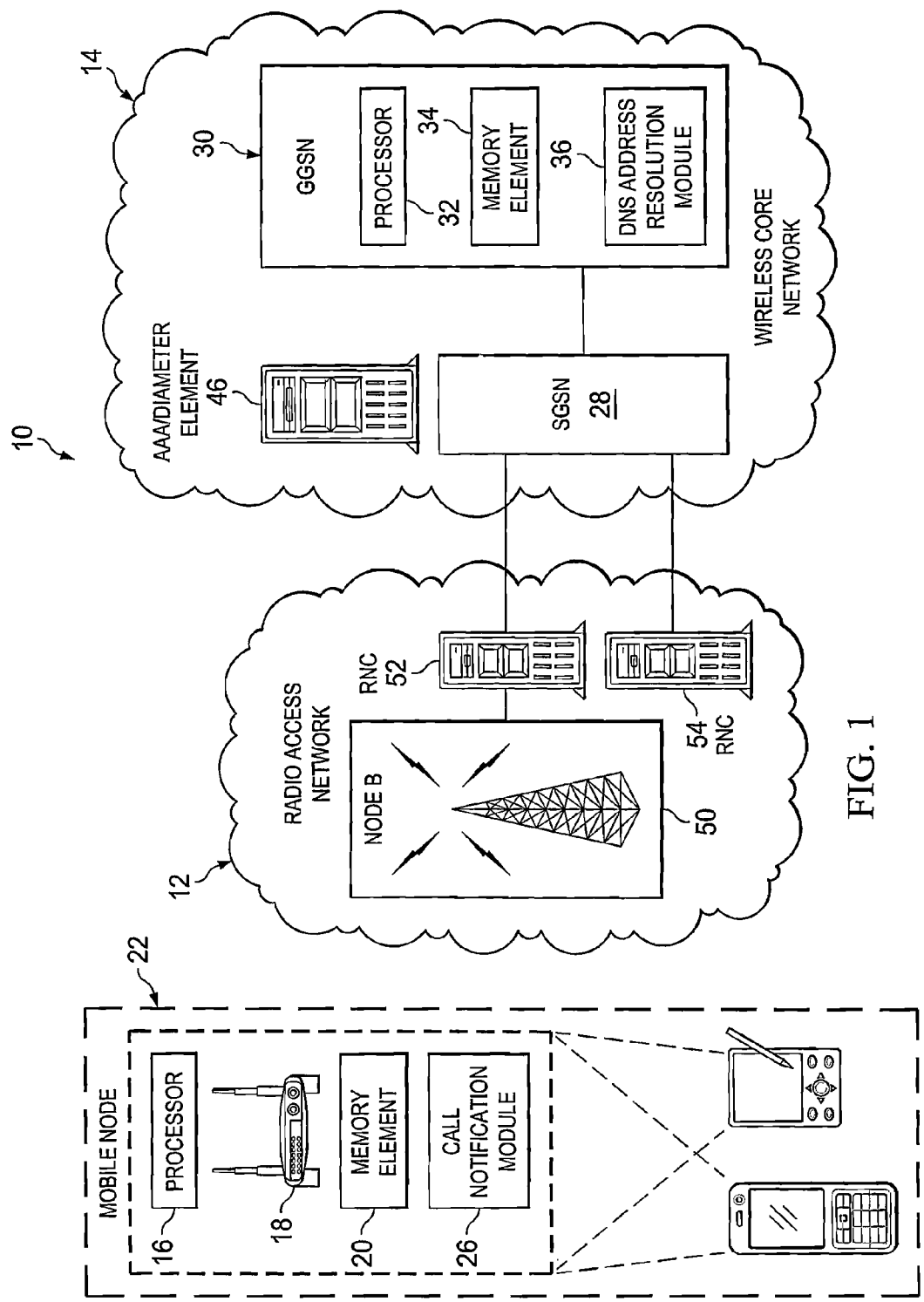
FIG. 1 is a simplified block diagram of a communication system for providing mobile node access in a network environment in accordance with one embodiment of the present disclosure.

Turning to FIG. 1, FIG. 1 is a simplified block diagram of a communication system 10 for providing mobile access in a network environment. FIG. 1 may include a radio access network (RAN) 12, a wireless core network 14, and a mobile node 22, which may include a router capability (e.g., offered by router 18), a processor 16, a memory element 20, a call notification module 26, and 2.5G/3G/4G mobile wireless terminal capabilities. FIG. 1 also illustrates radio network controllers (RNCs) 52 and 54, which may interface with a Node-B 50. FIG. 1 also includes a serving General Packet Radio Service (GPRS) Support Node (SGSN) 28, and a Gateway GPRS Support Node (GGSN) 30, which includes a processor 32, a memory element 34, and a Domain Name System (DNS) address resolution module 36. GGSN 30 may interface with an Authentication, Authorization, and Accounting (AAA)/DIAMETER element 46.

Communication system 10 may generally be configured or arranged to represent a3G architecture applicable to a Universal Mobile Telecommunications System (UMTS) environment in accordance with a particular embodiment. However, the 3G UMTS architecture is offered for purposes of example only and may alternatively be substituted with any suitable wireless networking system or arrangement that provides a communicative platform for communication system 10.

In some embodiments, communication system 10 can offer an optimized architecture for the use of dynamic DNS to establish an incoming data call session for a mobile device. The mobile device can be currently attached to a network but not necessarily connected at an internet protocol (IP) layer, as outlined below. For example, mobile node 22 can attach at the radio layer and this attachment could occur as mobile node 22 is switched on and served by a base station associated with a particular cell. Mobile node 22 can connect to the access network at an IP layer for data communication. Such a technique, in which a GGSN can operate as a real-time dynamic name server, can apply to both the statically and dynamically allocated IP addresses for mobile nodes.

As a general notion, dynamic DNS allows domain names of IP hosts to update their dynamically assigned IP address: potentially in real-time. Dynamic DNS allows the client computers or mobile nodes to register and dynamically update their resource records with a service provider's DNS server and this can occur whenever an IP address change occurs. In operation, each layer-three connection from a mobile node consumes network resources regardless of whether the data connection is idle or active. IP addresses and radio bearer resources should be conserved in such network environments. In certain examples presented herein, GGSN 30 conserves resources and, further, can act as a dynamic DNS server. GGSN 30 can allocate the IP address to mobile node 22 and, therefore, it can also update the IP address assigned to mobile node 22. Such a protocol offers a mechanism to employ dynamic DNS to establish a session-based data call to a mobile node that is attached, but not necessarily connected, to a network at the IP layer.

Before turning to some of the operations of this architecture, a brief discussion is provided about some of the infrastructure of FIG. 1. Mobile node 22 can be associated with IP clients wishing to initiate a connection using communication system 10 to access (for example) a WAN. There could be other mobile nodes (e.g., WiFi devices), wired devices connected to mobile node 22 and, further, router 18 can serve these other devices in example embodiments. The term 'mobile node' is inclusive of devices used to initiate a communication, such as a computer, a 2.5G/3G/4G wireless capable router, a personal digital assistant (PDA), a laptop or electronic notebook, a cellular telephone, an I-phone, an IP phone, or any other device, component, element, or object capable of initiating voice, audio, video, or data exchanges utilizing communication system 10. Mobile node 22 may also be inclusive of a suitable interface to the human user, such as a microphone, a display, or a keyboard or other terminal equipment. Mobile node 22 may also be any device that seeks to initiate a communication on behalf of another entity or element, such as a program, a database, or any other component, device, element, or object capable of initiating an exchange using communication system 10. Data, as used herein in this document, refers to any type of numeric, voice, video, or script data, or any type of source or object code, or any other suitable information in any appropriate format that may be communicated from one point to another.

RAN 12 is a communications interface between mobile node 22 and SGSN 28. RAN 16 could include a base transceiver station (e.g., Node-B) and a radio network controller or a base station controller in one embodiment. The communications interface provided by RAN 16 may allow data to be exchanged between an end user and any number of selected elements within communication system 10. RAN 16 may facilitate the delivery of a request packet generated by mobile node 22 and the reception of information sought by an end user. RAN 16 is only one example of a communications interface between an end user and SGSN 28. Other suitable types of communications interfaces may be used for any appropriate network design and, further, be based on specific communications architectures in accordance with particular needs.

Node-B 50 is a communicative interface, which may comprise radio transmission/reception devices, components, or objects, and antennas. Node-B 50 may be coupled to radio network controllers 52 and 54 (via one or more intermediate elements) that use a landline (such as a T1/E1 line, for example) interface. Node-B 50 may operate as a series of complex radio modems where appropriate. Node-B 50 may also perform transcoding and rate adaptation functions in accordance with particular needs. Radio network controllers 52 and 54 generally operate as management components for a radio interface. This management may be done through remote commands to a corresponding Node-B within a mobile network. Some of the responsibilities of radio network controllers 52 and 54 may include management of radio channels and assisting in handoff/handover scenarios. Radio network controllers 52 and 54 can alternatively provide for outer loop power control, load control, admission control, packet scheduling, security functions, etc.

SGSN 28 and GGSN 30 are communication nodes or elements that cooperate in order to facilitate a communication session involving mobile node 22. GGSN 30 is a communications node operating in a GPRS environment and may be working in conjunction with multiple SGSNs to provide a communications medium in a GPRS service network. GGSN 30 may be inclusive of a walled garden (providing a security or an access functionality to communication system 10) or any other suitable mechanism that a network operator may choose to implement in providing some connectivity for a network. GPRS represents a packet-based data bearer service for communication services that may be delivered as a network overlay for any type of suitable network configuration or platform. GPRS may support multiple internet communication protocols and may enable existing IP, point-to-point protocol (PPP), or any other suitable applications or platforms to operate over a given network.

Wireless core network 14 represents a series of points or nodes of interconnected communication paths for receiving and transmitting packets of information that propagate through communication system 10. Wireless core network 14 offers a communicative interface between mobile node 22 and selected GGSNs, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Wireless core network 14 may implement a user datagram protocol (UDP)/internet protocol (UDP/IP) connection and use a transmission control protocol (TCP/IP) communication language protocol in particular embodiments of the present disclosure. However, wireless core network 14 may alternatively implement any other suitable communication protocol for transmitting and receiving data packets within communication system 10.

In one example, two locations may be utilized in order to achieve the access activities outlined herein. First, GGSN 30 can be configured to act as a dynamic DNS server. This may be achieved within DNS address resolution module 36, or within any other suitable location of GGSN 30, both of which are outlined below. Second, a given router (e.g., router 18) may be suitably enhanced in order to achieve the operations discussed herein. The router can be part of the functions of mobile node 22 in one example implementation. The router can provide a host of services to its end users using a full suite of GPRS capabilities. The router can be provisioned within mobile node 22, for example, using any appropriate element (e.g., an access card). For example, the router can offer a cellular interface, providing suitable connectivity for multiple devices associated with mobile node 22. Router 18 can be provisioned in any device that is capable of interfacing with a cellular network. The communications involving GGSN 30 and the networks of FIG. 1 can allow an incoming call to be received by mobile node 22 (or router 18) regardless of whether the device is functionally online.

Thus, in an example implementation, DNS address resolution module 36 provides a dynamic address resolution capability for mobile devices within the network. Call notification module 26 provides an alert mechanism for incoming data (such as an incoming call). Call notification module 26 may assist in coordinating network-originated data, services, sessions, etc. It may participate in the registering activities associated with mobile node 22. This module may alert router 18 and/or mobile node 22 about incoming calls. Both of these modules represent application software, or software functions in one example embodiment.

In one example instance, mobile node 22 can provide normal handset operations in setting up packet data protocol (PDP) contexts or sessions, which are facilitated through a link beginning at Node-B 50, to RNC 52, to SGSN 28, and then terminating at GGSN 30. Once the data session has been established, a mobile subscriber can originate new data flows, such as going to a website to download selected information. Additionally, mobile node 22 can receive calls from other subscribers trying to reach this particular end user. Because mobile node 22 includes router 18, it can have multiple subscribers associated with a particular router. A simple table could store such information, which tracks the subscribers associated with a particular router. Note that in other instances, router 18 is separate from mobile node 22 and operates as its own separate network appliance in facilitating the operations outlined herein.

Consider a simple case in which router 18 includes two interfaces. One interface may provide UMTS connectivity, and, further, provide wireless access for an associated end user. A second interface may provide a layer-two interface (e.g., Ethernet) connectivity capability being provided to the end user. For example, the Ethernet interface may consist of client hosts (served by mobile node 22) working in a given office and these client hosts may have a wide area network connectivity through the UMTS WAN connectivity. The challenge lies in reaching mobile node 22/client hosts, for example, through e-mail or through a text message. To reach these users/clients, the identity of mobile node 22 can be used. This could involve using a Fully Qualified Domain Name [FQDN] (e.g., ms123.wisp.net), or any such data relating to the domain name. Communication system 10 can automatically discover the location of a given mobile node 22 and then systematically alert a mobile node of an incoming session/call. Thus, the targeted mobile node is notified of the call and is encouraged to receive this particular data call.

In one example implementation, GGSN 30 is a gateway, which in more specific embodiments could be a serving gateway (SGW), a packet gateway (PGW), a public data network (PDN) gateway, a packet data node (PDN) gateway, or any other gateway configured to interface with a network. This could involve applications involving GSM, GPRS/UMTS, CDMA, or any other suitable radio transmission technology for providing access to one or more subscribers. GGSN 30 is a network element that facilitates service flows between endpoints and a given network (e.g., for networks such as those illustrated in FIG. 1). As used herein in this Specification, the term 'network element' is meant to encompass network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In operation, GGSN 30 can provide mobility support in acting as a real-time dynamic name server.

In one example implementation, mobile node 22 includes software to achieve the call notification operations, as outlined herein in this document. In other embodiments, this feature may be provided externally to mobile node 22 or included in some other network device to achieve this intended functionality. Alternatively, GGSN 30 and mobile node 22 include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

AAA/DIAMETER element 46 is a server program that handles requests [from other network elements on behalf of user equipment] for access to networking resources. Networking resources refers to any device, component, or element that provides some functionality to endpoints communicating in communication system 10. For a corresponding network, AAA elements [i.e., AAA/DIAMETER element 46] may also provide authentication, authorization, and accounting services and management. Authorization generally refers to the process of giving endpoints permission to do or to access something. In multi-user computer systems, a system administrator may define for the system which end users are allowed access to particular data in the system and, further, what privileges are provided for endpoints. Once an end user has logged into a network, the network may wish to identify what resources the end user is given during the communication session. Thus, authorization within communication system 10 may be seen as both a preliminary setting up of permissions by a system administrator and the actual checking or verification of the permission values that have been set up when the end user is attempting access. Authentication generally refers to the process of determining whether the end user is in fact who or what it is declared to be.

AAA elements typically interact with network access servers and gateway servers, and with databases and directories containing user information. One standard by which devices or applications communicate with an AAA element is through a Remote Authentication Dial-In User Service (RADIUS) protocol, while other standards that could be employed include the Terminal Access Controller Access Control System (TACACS) or DIAMETER protocols. Use of the slash in labeling this element in FIG. 1 is meant to connote that it could serve either protocol, or both protocols.

AAA elements may receive the IP address and other parameters from any suitable source, such as a dynamic host configuration protocol (DHCP) server or a DNS database element, in order to direct data to be communicated to an end user. The AAA element may include any suitable hardware, software, component, or element that operates to receive data associated with an end user and that provides corresponding AAA related functions to network components within communication system 10. Authorization and IP address management may also be retrieved by the AAA element from a layer two tunneling protocol network server (LNS), which may be provided to address secure services for the end user where appropriate. The assigned IP address may be a private VPN or a public IP address.

Figure 2:
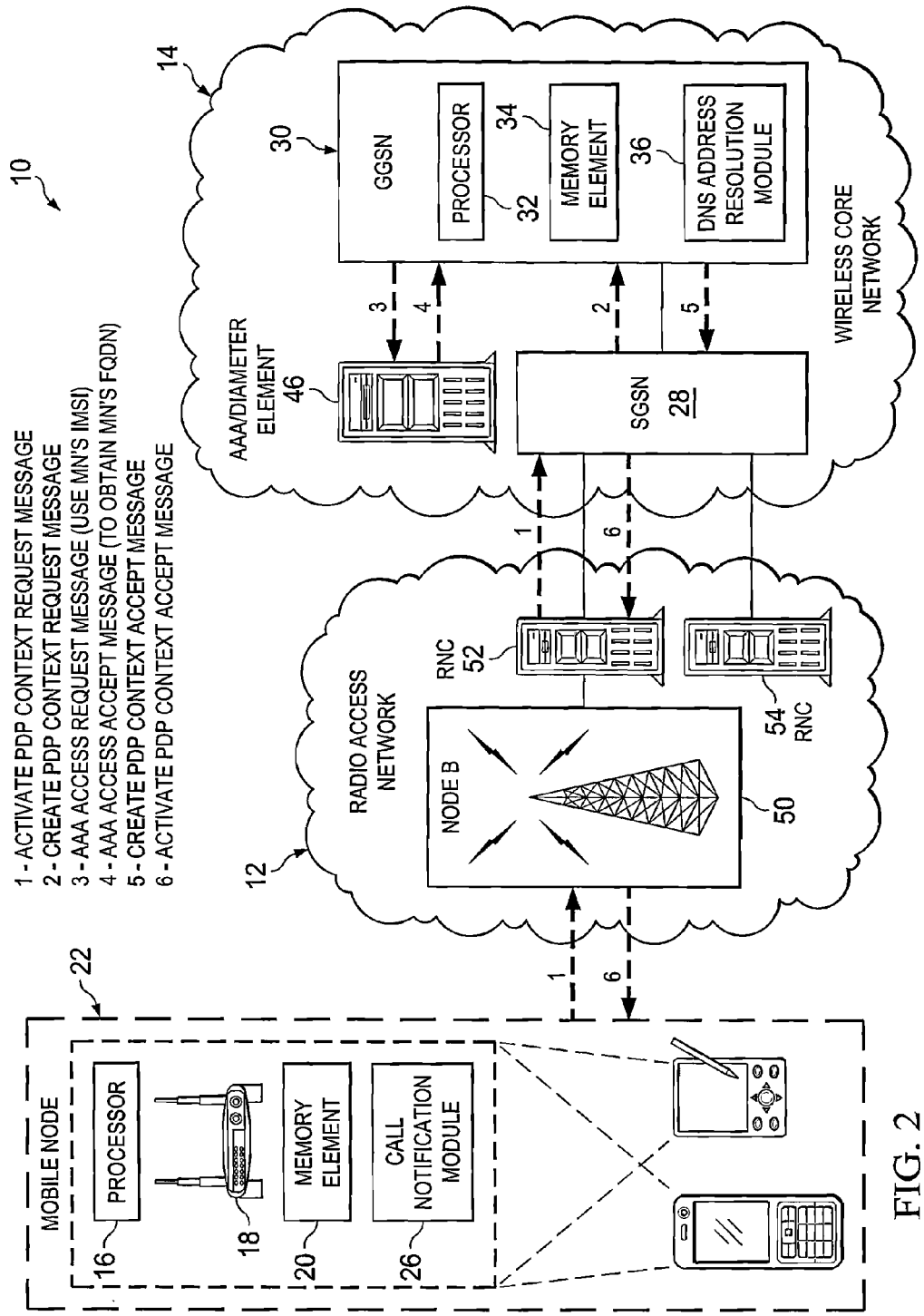
FIG. 2 is a simplified block diagram of a communication system for providing mobile node access in a network environment in accordance with another embodiment of the present disclosure.

FIG. 2 is a simplified block diagram illustrating a network initiated cellular mobile node access for communication system 10 in one example implementation. FIG. 2 depicts various steps for establishing a tracking PDP context in one example in which a set of arrows are used for purposes of illustration. Before reviewing the exact steps involved in such a scenario, a brief overview is offered. When a mobile router is turned on, it attempts to logically attach to a wireless network. Aside from registration activities, router 18 also indicates to the network that, if there are any sessions/calls intended for its associated device (e.g., mobile node 22), there is an identifiable instance of the session. The initial signaling provides the identity of mobile node 22.

By way of background, a PDP context is a data structure present on both SGSN and the GGSN, which contains the subscriber's session information when the subscriber has an active session. When a mobile wants to use GPRS, it should first attach and then activate a PDP context. This allocates a PDP context data structure in the SGSN that the subscriber is currently visiting and the GGSN serving the subscribers access point. The data recorded can include the subscriber's IP address, the subscriber's IMSI, the subscriber's tunnel endpoint ID (TEID) at the GGSN and SGSN. There are two kinds of PDP contexts: primary PDP context (which has a unique IP address associated with it) and a secondary PDP context (which shares an IP address with another PDP context). The tracking PDP context is a variation of a standard PDP context in which a limited number of fields are used to identify certain parameters, while not necessarily consuming an IP address.

Turning to step 1 of FIG. 2, the first signaling occurs between mobile node 22, Node-B 50, RNC 52, and SGSN 28. The operations are intended to activate a tracking PDP context through an associated request message. More specific to this non-limiting example, the tracking PDP context may include the following in the protocol configuration option (PCO) field: 1) requested IP address set to 0.0.0.0; 2) User Name/Host ID (FQDN format); and 3) a special access point name (APN) that supports a network initiated PDP context. Furthermore, the PCO may optionally indicate "IP Address Not Required', using a flag, to inform the wireless core network to not assign an IP address for this tracking PDP context.

At step 2, SGSN 28 creates a tracking PDP context request message, using the information obtained from step 1, as described above. At step 3, GGSN 30 may send along an AAA access request message (e.g., using the mobile node's International Mobile Subscriber Identity (IMSI), as detailed further below). Step 4 involves an AAA access accept message to obtain the mobile node's FQDN, and this implicates GGSN 30 (as a dynamic DNS) and its association with AAA/Diameter element 46. Thus, in steps 3 and 4, when GGSN 30 has the IMSI, it can send down a request to AAA/DIAMETER element 46 for the fully qualified domain name. A vendor specific/standard Attribute-Value (AV pair) field (e.g., data) can be used to carry such information. In still other embodiments, a proprietary communications protocol can be used to exchange the messaging. Thus, at this stage, GGSN 30 is obtaining the FQDN of mobile node 22 from the AAA node using its IMSI. At this point, GGSN 30 can establish a DNS 'A' record for this mobile node, using its FQDN, without associating an IP address.

At step 5, there is a create (i.e., tracking) PDP context accept message sent to SGSN 28, which in turn sends an activate (i.e., tracking) PDP context accept message at step 6. During these steps, no IP address is provided; the activities simply mark the user as being 'Allowed a Network Initiated PDP Context.' Note that what has essentially happened is that the fully qualified domain name has been retrieved from AAA 46 and stored in GGSN 30 while mobile node 22 is registering and attaching to the network. Thus, GGSN 30 has stored the identity for mobile node 22 while it is still in the network. Step 6 indicates a successful completion of this process and, further, that mobile node 22 can receive calls (e.g., for itself or on behalf of other devices to which it may be associated).

The above messaging creates a tracking PDP context in GGSN 30 for mobile node 22. It can allow tracking of mobile node 22 by GGSN 30. It should be noted that this newly formed PDP context does not use an IP address, nor does it consume radio bearer resources for data transmission purposes. In essence, mobile node 22 attaches to the network and its profile is cached at SGSN 28. Mobile node 22 can initiate its tracking PDP context with GGSN 30. SGSN 28 initiates a tracking PDP session to indicate to the dynamic name server (e.g., GGSN 30) to note that mobile node 22 is available to receive a network initiated PDP service. Operating as a dynamic name server, GGSN 30 can make note of the IMSI (e.g., or some other identifier for mobile node 22). It does not necessarily establish any traffic/data plane for the user at this time. While GGSN 30 does not allocate an IP address to mobile node 22, the tracking PDP context, nevertheless, allows GGSN 30 to track and communicate with mobile node 22, as is required.

In a general sense, the tracking PDP context fulfills several important functions. First, it provides mobile node 22 with constant reachability from the GGSN. The associated SGSN is known by the GGSN including when a mobile node is on the move. Second, the tracking PDP context saves important resources, for example IP addresses, radio bearer resources, etc. While the tracking PDP context is in place, mobile node 22 essentially remains in a dormant state.

Mobile node 22 can create a tracking PDP context having the following key parameters. The tracking PDP context is only required when mobile node 22 is not already on-line, using a 'Normal PDP Context' for user data. In addition, the 'Activate PDP Context Request' and 'Create PDP Context Request' messages for the tracking PDP context can contain a special APN potentially defined by the service provider. The APN can offer a mechanism for mobile node 22 (and GGSN 30) to indicate a desire to support a network initiated PDP context. The tracking PDP context can contain the user/host ID in a FQDN format, as well as the requested IP address set to 0.0.0.0. A PCO information element (IE) can be included in the tracking PDP context and be used by mobile node 22 to inform the network to not assign an IP address. The 'Create PDP Context Accept/Activate PDP Context Accept' messages for the tracking PDP context do not provide an IP address to mobile node 22.

Figure 3A:
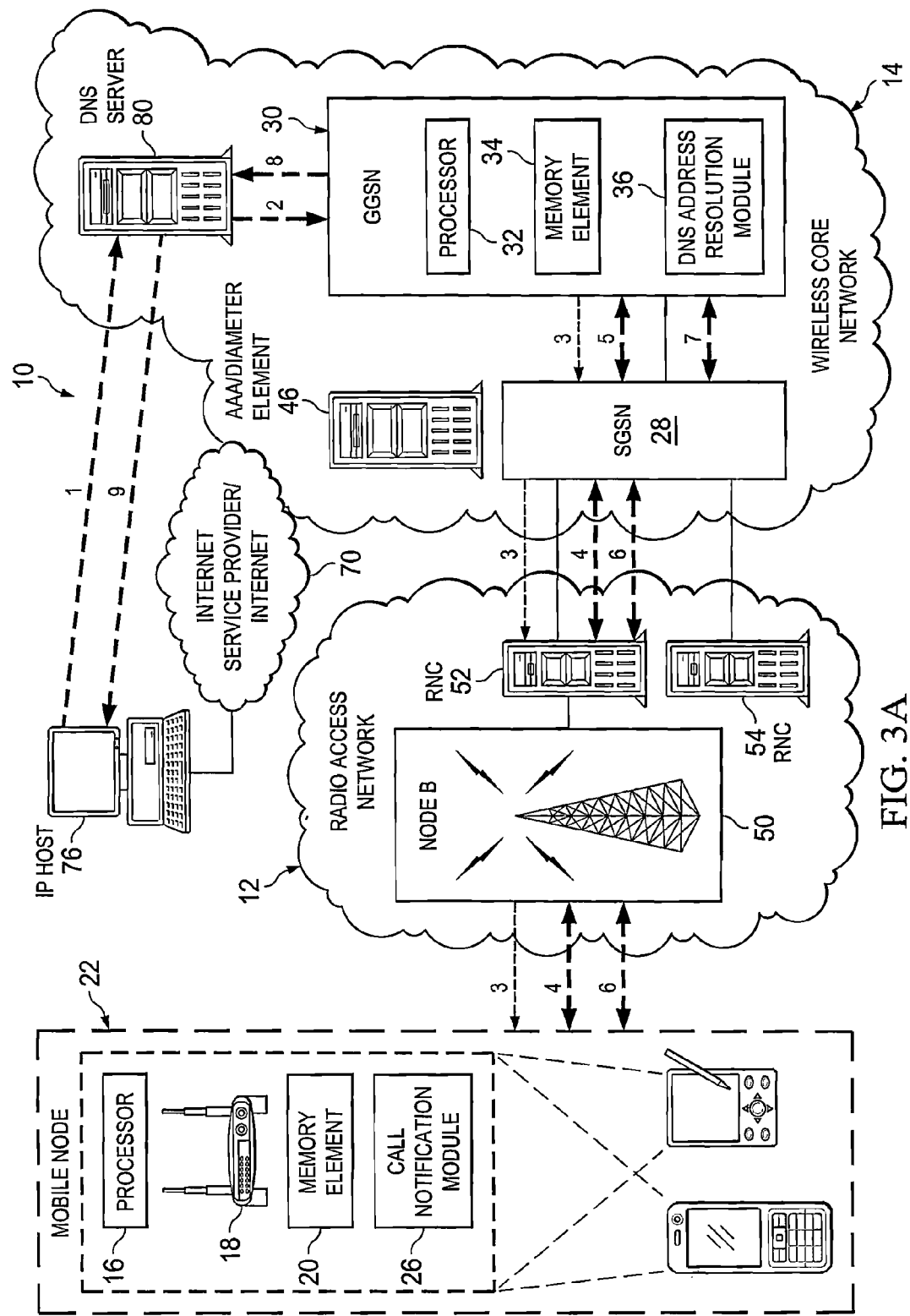
FIG. 3A is a simplified block diagram of a communication system for providing mobile node access in a network environment in accordance with another embodiment of the present disclosure.

FIG. 3A is a simplified block diagram illustrating an example configuration associated with communication system 10. FIG. 3A depicts a number of arrows that link to the example flow of FIG. 3B. FIG. 3A, in one example, can include an Internet service provider/Internet element 70, which is coupled to an IP host 76. IP host 76 can interface with DNS server 80, as outlined below. The following steps outline the corresponding network initiated PDP context establishment. Such activity could follow a DNS query from an IP Host when the tracking PDP context is in place.

Figure 3B:
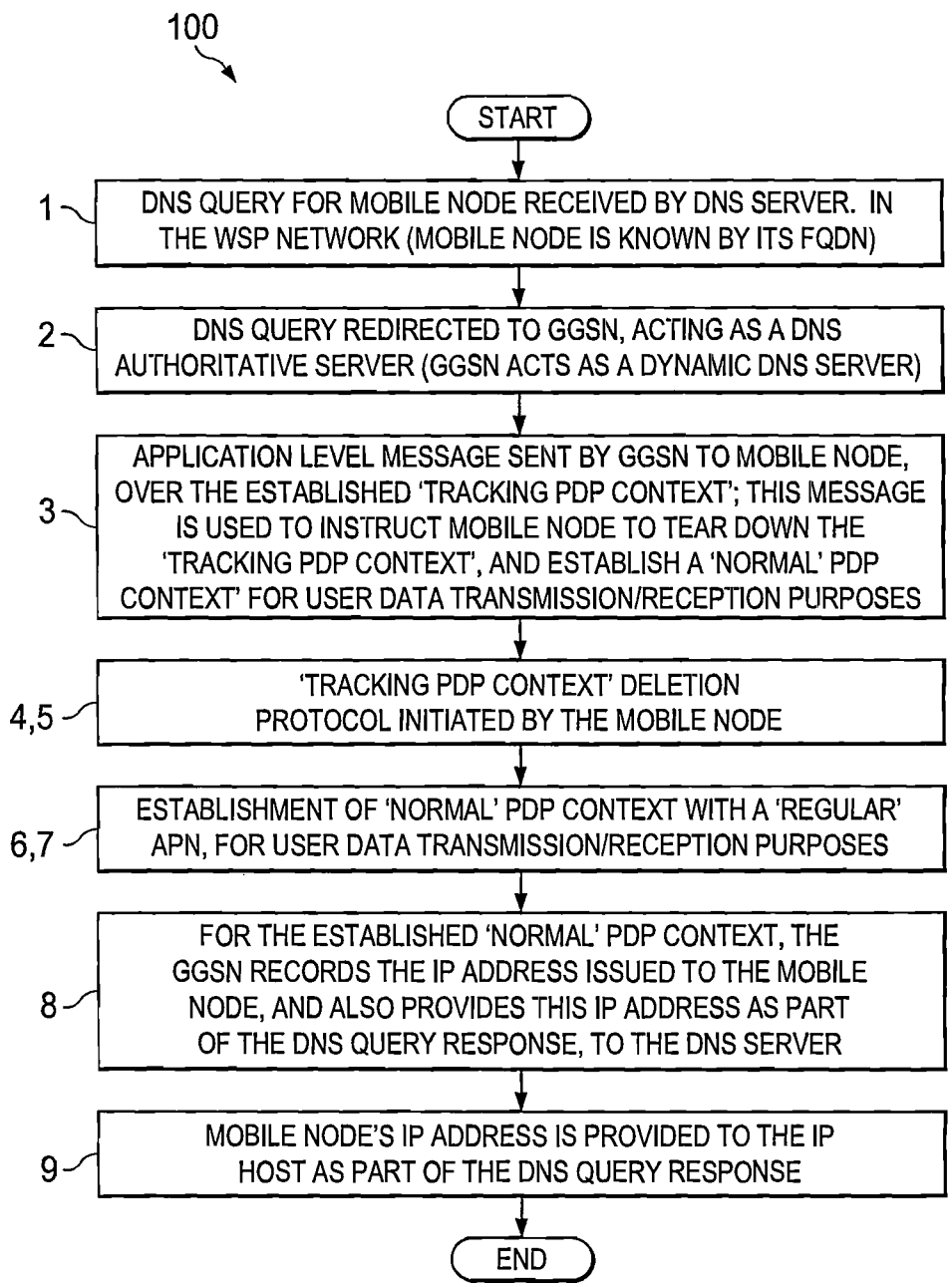
FIG. 3B is a simplified flow diagram illustrating a series of example steps associated with the communication system of FIG. 3A.

Before turning to the steps of FIG. 3B, an overview is provided to further illustrate some of the capabilities of communication system 10. Consider a case where mobile node 22 is attached to the network with a tracking PDP context in place. An end user (e.g., represented by IP host 76) wishes to contact mobile node 22. IP host 76 knows the identity of mobile node 22 and, further, understands that mobile node 22 can be reached through a particular fully qualified domain name (e.g., ms123.wisp.net). The identity of mobile node 22 has been cached in GGSN 30 as the fully qualified domain name. The FQDN is used by DNS server 80 to identify the Dynamic DNS server (e.g., GGSN 30). Subsequently the Dynamic DNS server completes the DNS A record by associating an IP address as described below.

After a DNS 'A' record has been established in GGSN 30, IP host 76 can communicate and send data to mobile node 22. An IP host in the network can send a DNS request to the DNS server with the FQDN of mobile node 22 to resolve its IP address. DNS server 80 in the service provider (SP) network can then redirect the query to GGSN 30, which acts as DNS authoritative server. The DNS 'Name Server' (NS) record in the SP DNS server (for this particular FQDN) points to the name server GGSN 30 for mobile node 22's domain name. This information can be used for IP address resolution for mobile node 22.

Upon finding a DNS 'A' record corresponding to the fully qualified domain name (FQDN) of mobile node 22, GGSN 30 can send an application level message to mobile node 22 via the update tracking PDP context. This message can instruct mobile node 22 to tear down the tracking PDP context and to initiate/activate a normal PDP context to receive the incoming data. Note that there are other possible mechanisms that can be utilized to communicate with mobile node 22 when mobile node 22 is attached (e.g., such as paging mobile node 22 to indicate receipt of pending user data for mobile node 22). Mobile node 22, upon receipt of the above described application level message (or a paging message), deletes the tracking PDP context, and establishes a normal PDP context with GGSN 30. The name server GGSN can allocate an IP address to this newly established PDP context for mobile node 22, and record this as part of the DNS 'A' record for mobile node 22. The IP address of mobile node 22 can be provided by the name server GGSN 30 as a response to the original DNS query received from the IP host in the network. At this point, the IP host in the network is now able to communicate with mobile node 22 using the IP address as provided by the name server GGSN 30.

Turning to the example flow of FIG. 3B, at step 1 a DNS query for mobile node 22 is received by DNS server 80. Mobile node 22 is known by its FQDN. At step 2, a DNS query is redirected to GGSN 30, which acts as a DNS authoritative server (i.e., GGSN acts as a dynamic DNS server). At step 3, an application level message is sent by GGSN 30 to mobile node 20 over the established tracking PDP context. This message can be used to instruct mobile node 22 to tear down the tracking PDP context, and establish a normal PDP context for user data transmission/reception purposes. In one example implementation, step 3 involves an application level messaging between two software components. Note that in step 3, an IP address has not been consumed by mobile node 22. The tracking PDP context is established, but radio resources are not being consumed. The tracking PDP context merely allows tracking, for example, as an end user moves from one coverage area of a Node-B to another coverage area of an adjacent Node-B.

At steps 4 and 5, the tracking PDP context deletion protocol is initiated by mobile node 22. At steps 6 and 7, mobile node 22 initiates an establishment of a normal PDP context with a regular APN for user data transmission/reception purposes. Step 7 involves creating a PDP context, and once GGSN 30 establishes this, an IP address is assigned to mobile node 22 for purposes of communication. The response to the message in step 7 involves communicating (e.g., to DNS server 80) that the previous IP address has been given to mobile mode 22.

At step 8, for the established normal PDP context, GGSN 30 records the IP address issued to mobile node 22, and provides this IP address as part of the DNS query response to DNS server 80. At step 9, the mobile node's IP address is provided to the IP host as part of the DNS query response. This activity essentially informs IP host 76 of the IP address assignment conducted by GGSN 30. With an appropriate IP address assigned and provisioned in the DNS A record in the GGSN 30, a subsequent communications flow can occur in the network.

In regards to the internal structure associated with communication system 10, each of GGSN 30 and mobile node 22 can include memory elements for storing information to be used in achieving the address resolution and/or coordination operations, as outlined herein. Additionally, each of these devices may include a processor that can execute software or an algorithm to perform the address resolution and/or coordination activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' The information being tracked by GGSN 30 and/or mobile node 20 could be provided in any database, register, control list, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the dynamic DNS resolution, call notification, and/or coordinating functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 3 illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain AAA, registration, and protocols, communication system 10 may be applicable to other exchanges, routing protocols, or routed protocols in which packets (not necessarily the routing protocol/packets described) are exchanged in order to provide AAA information, DNS parameters, address management, etc. Moreover, although communication system 10 has been illustrated with reference to particular elements and operations that facilitate the communication process, these elements and operations may be replaced by any suitable architecture or process that achieves the intended functionality of communication system 10. In a separate endeavor, although communication system 10 has discussed use of UMTS, the present disclosure is equally applicable to other cellular technology including CDMA, Wi-Fi, WiMax, etc. It should also be noted that other practical applications of communication system 10 can involve telemetry, digital signage, service provider managed remote devices, etc. For large service providers and enterprises, such address management capabilities (as outlined herein) can provide mobile-to-mobile (M2M) functionality. The delivery of data calls using a dynamic DNS can also be applied when mobile node 22 is roaming in a home network or a visited network (locally, nationally, internationally, etc.).

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
communicating an access request message associated with a mobile node that includes a router, wherein the access request message includes an International Mobile Subscriber Identity (IMSI) associated with the mobile node, wherein the router includes a first interface that provides a universal mobile telecommunications system connectivity and a second interface that provides a layer-two interface connection, wherein the second interface includes a client host, and wherein the router allows for a cellular interface for multiple devices associated with the mobile node;
receiving an access accept message that includes domain name data associated with the mobile node; and
communicating a packet data protocol (PDP) context accept message from a general packet radio service (GPRS) support node (GSN) for a tracking PDP context associated with the mobile node without associating an internet protocol (IP) address to the mobile node, wherein the tracking PDP context identifies that the mobile node is available to receive network data that can include e-mail and text messaging, and wherein the GSN is configured as a dynamic name server.

2. The method of claim 1, wherein the tracking PDP includes a Protocol Configuration Option (PCO) indicating that an IP address is not required for the mobile node.

3. The method of claim 1, further comprising:
establishing a Domain Name System (DNS) record for the mobile node without associating the DNS record to an IP address.

4. The method of claim 1, further comprising:
communicating an application level tear down message to the mobile node, the tear down message directing the mobile node to tear down the tracking PDP context; and
allocating an IP address to the mobile node after the tracking PDP context is torn down.

5. The method of claim 1, wherein the GSN is a gateway GSN (GGSN).

6. The method of claim 1, wherein the request message activates the tracking PDP context.

7. Non-transitory media encoded in code for execution and when executed by a processor operable to perform operations comprising:
communicating an access request message associated with a mobile node that includes a router, wherein the router includes a first interface that provides a universal mobile telecommunications system connectivity and a second interface that provides a layer-two interface connection, wherein the second interface includes a client host, and wherein the router allows for a cellular interface for multiple devices associated with the mobile node;
receiving an access accept message that includes domain name data associated with the mobile node; and
communicating a packet data protocol (PDP) context accept message from a general packet radio service (GPRS) support node (GSN) for a tracking PDP context associated with the mobile node without associating an internet protocol (IP) address to the mobile node, wherein the tracking PDP context identifies that the mobile node is available to receive network data that can include e-mail and text messaging, and wherein the GSN is configured as a dynamic name server.

8. The non-transitory media of claim 7, wherein the access request message includes an International Mobile Subscriber Identity (IMSI) associated with the mobile node.

9. The non-transitory media of claim 7, wherein the tracking PDP includes a protocol configuration option (PCO) indicating that an IP address is not required for the mobile node.

10. The non-transitory media of claim 7, wherein the operations further comprise:
establishing a domain name system (DNS) record for the mobile node without associating the DNS record to an IP address.

11. The non-transitory media of claim 7, wherein the domain name data includes a fully qualified domain name.

12. The non-transitory media of claim 7, wherein the operations further comprise:
communicating an application level tear down message to the mobile node, the tear down message directing the mobile node to tear down the tracking PDP context; and
allocating an IP address to the mobile node after the tracking PDP context is torn down.

13. An apparatus, comprising:
a memory element configured to store data, a processor operable to execute instructions associated with the data, and a domain name system (DNS) module configured to interface with the processor in order to:

generate an access request message associated with a mobile node that includes a router, wherein the router includes a first interface that provides a universal mobile telecommunications system connectivity and a second interface that provides a layer-two interface connection, wherein the second interface includes a client host, and wherein the router allows for a cellular interface for multiple devices associated with the mobile node;

evaluate an access accept message that includes domain name data associated with the mobile node; and communicate a packet data protocol (PDP) context accept message from a general packet radio service (GPRS) support node (GSN) for a tracking PDP context associated with the mobile node without associating an internet protocol (IP) address to the mobile node, wherein the tracking PDP context identifies that the mobile node is available to receive network data that can include e-mail and text messaging, and wherein the GSN is configured as a dynamic name server.

14. The apparatus of claim 13, wherein the access request message includes an International Mobile Subscriber Identity (IMSI) associated with the mobile node.

15. The apparatus of claim 13, wherein the tracking PDP includes a protocol configuration option (PCO) indicating that an IP address is not required for the mobile node.

16. The apparatus of claim 13, wherein the DNS module is configured to interact with the processor in order to establish a DNS record for the mobile node without associating the DNS record to an IP address.

17. The apparatus of claim 13, wherein the domain name data includes a fully qualified domain name.

18. The apparatus of claim 13, wherein the processor and the DNS module are provided in a network element configured to communicate an application level tear down message to the mobile node, the tear down message directing the mobile node to tear down the tracking PDP context.

19. The apparatus of claim 18, wherein the network element is further configured to allocate an IP address to the mobile node after the tracking PDP context is torn down.

20. The method of claim 5, wherein the GGSN can allocate an IP address to the mobile node and establish a session based data call to the mobile node while the mobile node is attached to a network but not connected to the network at an IP layer.

* * * * *